United States Patent
Potter

(10) Patent No.: US 9,582,011 B2
(45) Date of Patent: Feb. 28, 2017

(54) INTEGRATED ATTIC VENTILATION, AIR CONDITIONING AND HEATING SYSTEM ELECTRONIC CONTROLLER AND SYSTEM AND METHOD FOR USE OF SAME

(71) Applicant: Paul Stuart & Associates, LLC., Plano, TX (US)

(72) Inventor: Paul S. Potter, Plano, TX (US)

(73) Assignee: Paul Stuart & Associates, LLC., Plano, TX (US)

( * ) Notice: Subject to any disclaimer, the term of this patent is extended or adjusted under 35 U.S.C. 154(b) by 436 days.

(21) Appl. No.: 14/023,514

(22) Filed: Sep. 11, 2013

(65) Prior Publication Data

US 2014/0081468 A1 Mar. 20, 2014

Related U.S. Application Data

(60) Provisional application No. 61/701,579, filed on Sep. 14, 2012.

(51) Int. Cl.
*G05D 23/19* (2006.01)
*G05D 22/02* (2006.01)
(Continued)

(52) U.S. Cl.
CPC ....... *G05D 23/1917* (2013.01); *F24F 11/0001* (2013.01); *F24F 11/0012* (2013.01);
(Continued)

(58) Field of Classification Search
CPC .... G05D 23/1917; G05D 27/02; G05D 22/02; G05D 23/19; F24F 11/0012; F24F 11/0015; F24F 11/0001; F24F 2011/0075; F24F 2007/004; Y02B 30/767
See application file for complete search history.

(56) References Cited

U.S. PATENT DOCUMENTS 4,251,026 A * 2/1981 Siegel ............... F24F 11/0001
236/46 R
4,776,385 A 10/1988 Dean
(Continued)

OTHER PUBLICATIONS

Southface Energy Institute, "Ceiling and Attic Insulation and Ventilation," Energy technical bulletin 25, Mar. 5, 2002, Atlanta, Georgia.

*Primary Examiner* — Kenneth M Lo
*Assistant Examiner* — David Wynne
(74) *Attorney, Agent, or Firm* — Scott T. Griggs; Griggs Bergen LLP

(57) ABSTRACT

An integrated attic ventilation, air conditioning and heating system electronic controller, with a system and method for use of the same, is disclosed. In one embodiment, the integrated electronic controller includes a housing configured to be secured within an attic space in a building structure having a living area. A temperature input and humidity input receive ambient temperature and humidity readings, respectively. The ambient measurements are compared to pre-determined temperature and humidity thresholds. If a threshold is exceeded, signals are send to actuate, in a coordinated fashion, a powered air intake and powered attic exhaust assembly. The powered air intake and powered attic exhaust assembly are operated intermittently, in coordination with the HVAC system, initially at a first set of extreme thresholds and operated constantly at a second set of more extreme thresholds.

19 Claims, 5 Drawing Sheets

(51) Int. Cl.
*G05D 27/02* (2006.01)
*F24F 11/00* (2006.01)
*F24F 7/00* (2006.01)

(52) U.S. Cl.
CPC .......... *F24F 11/0015* (2013.01); *G05D 22/02* (2013.01); *G05D 23/19* (2013.01); *G05D 27/02* (2013.01); *F24F 2007/004* (2013.01); *F24F 2011/0075* (2013.01); *Y02B 30/767* (2013.01)

(56) References Cited

U.S. PATENT DOCUMENTS

| | | | |
|---|---|---|---|
| 4,831,921 A | 5/1989 | Potter | |
| 5,049,801 A * | 9/1991 | Potter | F24F 11/0001 236/49.3 |
| 5,364,026 A * | 11/1994 | Kundert | F24F 7/06 236/49.3 |
| 5,902,183 A * | 5/1999 | D'Souza | F24F 11/006 236/49.3 |
| 7,758,408 B2 * | 7/2010 | Hagentoft | F24F 11/0001 236/44 A |
| 7,798,418 B1 * | 9/2010 | Rudd | F24F 3/001 236/49.3 |
| 7,802,618 B2 * | 9/2010 | Simon | F24F 11/0012 165/254 |
| 8,267,164 B2 | 9/2012 | Lestage et al. | |
| 8,474,728 B2 * | 7/2013 | Cislo | F24F 7/06 236/49.3 |
| 8,543,244 B2 * | 9/2013 | Keeling | F24D 19/1066 700/276 |
| 2005/0191957 A1 | 9/2005 | Demetry et al. | |
| 2007/0243820 A1 * | 10/2007 | O'Hagin | F24F 7/025 454/365 |
| 2012/0046797 A1 * | 2/2012 | Grohman | F24F 11/0009 700/296 |
| 2013/0040550 A1 * | 2/2013 | Pfister | F24F 11/0001 454/239 |
| 2014/0045482 A1 * | 2/2014 | Bisson | G05D 23/1905 455/420 |
| 2014/0202449 A1 * | 7/2014 | Snyder | F24F 5/0035 126/714 |

* cited by examiner

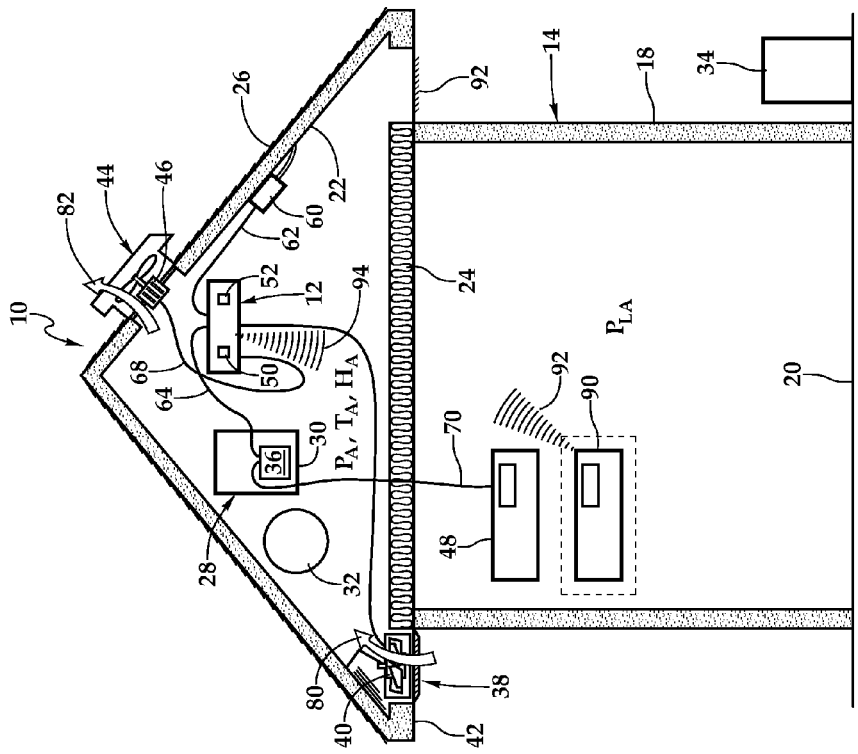
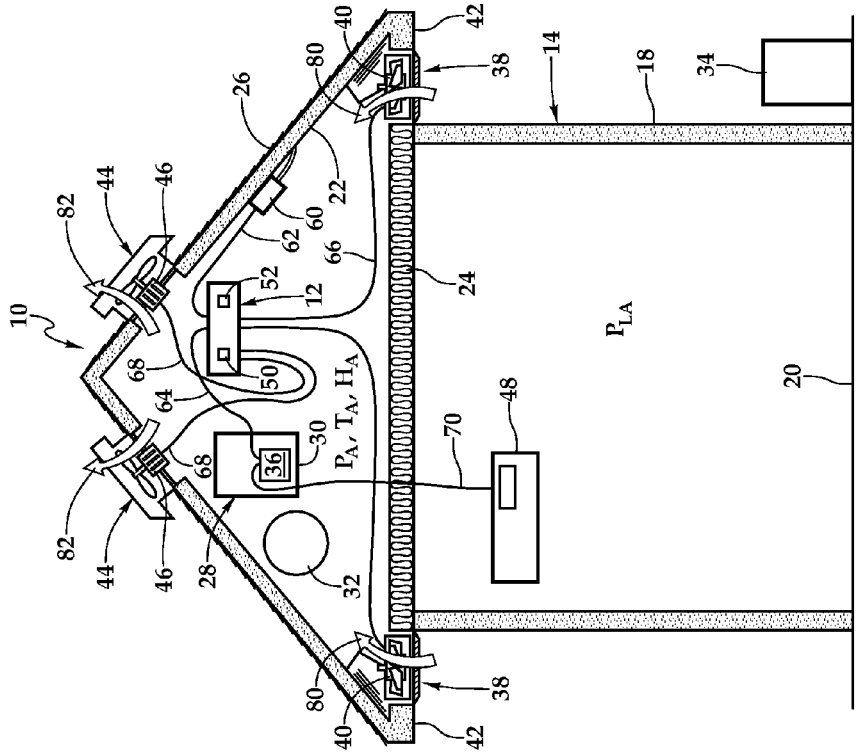

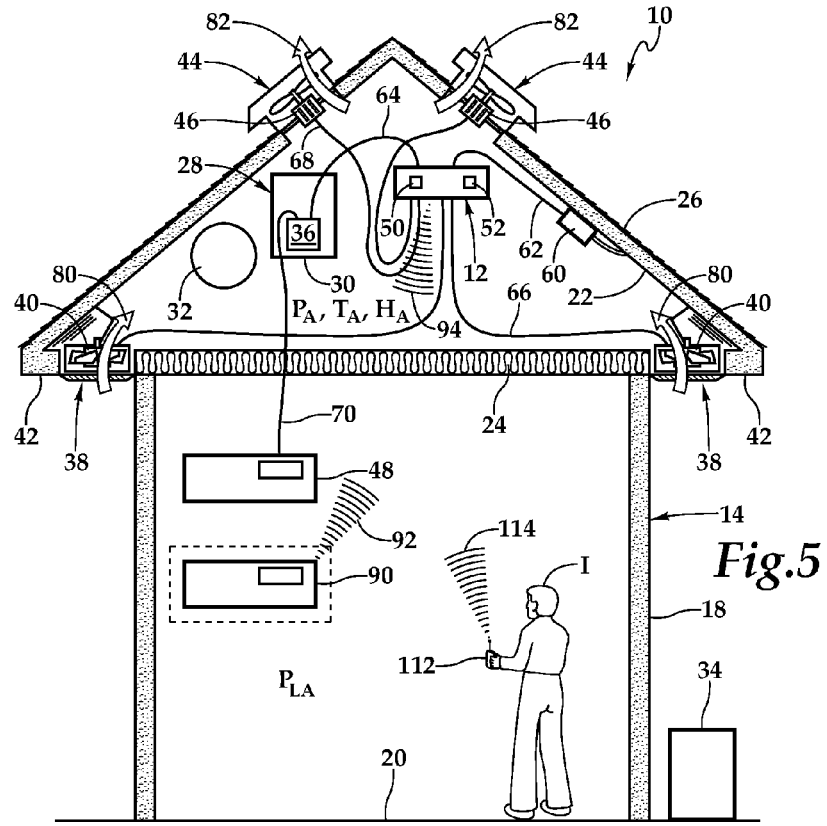
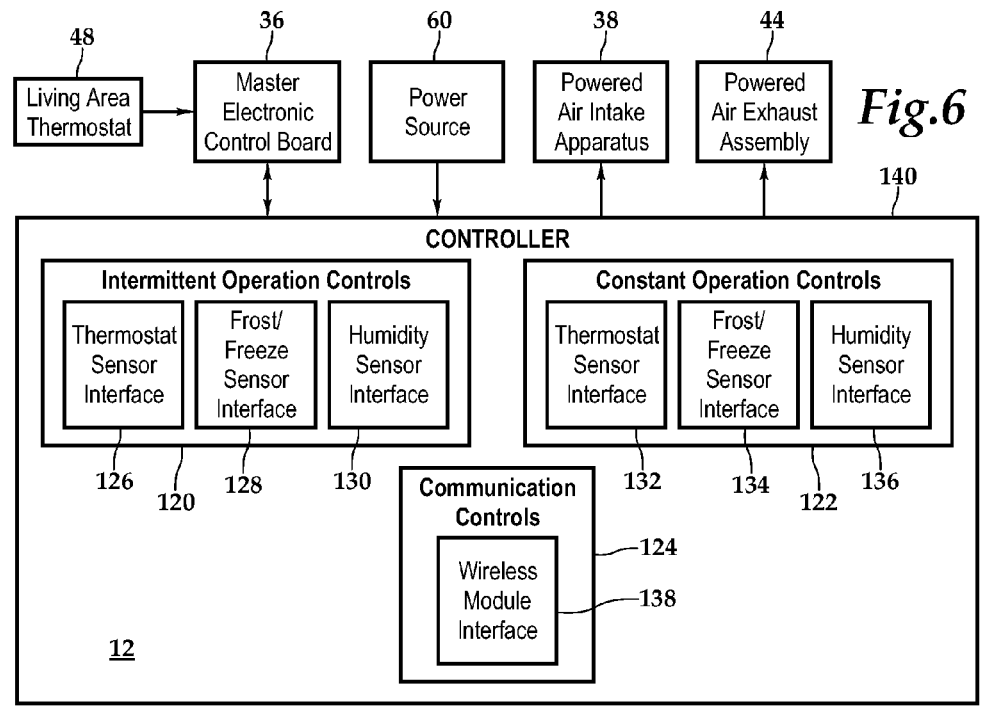
Fig.5
Fig.6

INTEGRATED ATTIC VENTILATION, AIR CONDITIONING AND HEATING SYSTEM ELECTRONIC CONTROLLER AND SYSTEM AND METHOD FOR USE OF SAME

PRIORITY STATEMENT AND CROSS-REFERENCE TO RELATED APPLICATION

This application claims priority from U.S. Application Ser. No. 61/701,579 entitled "Integrated Attic Ventilation, Air Conditioning and Heating System Electronic Controller" and filed on Sep. 14, 2012 in the name of Paul S. Potter; which is hereby incorporated by reference for all purposes.

TECHNICAL FIELD OF THE INVENTION

This invention relates, in general, to environmental control systems for building structures having attic spaces and, in particular, to an integrated attic ventilation, air conditioning and heating system electronic controller, including a system and method for use of same, that provides efficient cooling and heating of a living area within the building structure.

BACKGROUND OF THE INVENTION

Temperature and moisture control within the attic space of a building structure are critical. With respect to temperature, the air conditioning load is intensified by the thermal storage effect associated with the attic air space found in most dwellings. Air circulates very slowly in the attic air space so that its temperature rises rapidly as solar radiation is absorbed. As a result, a large amount of heat is transferred from the exposed roof structure to the air trapped within the attic air space. With respect to moisture control, by way of example, in cold weather, a combination of high, inside relative humidity and low outside temperature may cause condensation on the underside of the roof sheathing. If the moisture is not removed, the resulting condensate may cause insulation and construction materials to deteriorate. In light of the foregoing, an ongoing need exists for improved attic ventilation systems which ensures proper thermal and moisture control in building structures, including many types of residential homes, having attic spaces.

SUMMARY OF THE INVENTION

It would be advantageous to achieve integrated ventilation, air conditioning and heating system electronic control, for example, that would provide proper thermal and moisture control ventilation in building structures having attic spaces. It would also be desirable to enable electro-mechanical and computer-based solutions that would mitigate or eliminate inefficiencies that arise through the uncoordinated independent actions of various air conditioning and heating system components. To better address one or more of these concerns, integrated attic ventilation, air conditioning and heating system electronic controllers are disclosed.

In one embodiment of an integrated electronic controller, a housing is configured to be secured within an attic space in a building structure having a living area. A temperature input and humidity input receive ambient temperature and humidity readings, respectively. The ambient measurements are compared to pre-determined temperature and humidity thresholds. If a threshold is exceeded, signals are sent to actuate, in a coordinated fashion, a powered air intake and powered attic exhaust assembly. The powered air intake and powered attic exhaust assembly are operated intermittently, in coordination with the HVAC system, initially at a first set of extreme thresholds and operated constantly at a second set of more extreme thresholds.

In another aspect, a system and method for use of the integrated electronic controller is provided. An integrated electronic controller is located within an attic space and disposed in control communication with an HVAC system having an intermittent operational mode and a constant operational mode. The integrated electronic controller is configured, based on a first or intermittent temperature threshold comparison, to coordinate the operation of a powered air intake apparatus and a powered attic exhaust assembly with the operational mode of the HVAC system such that actuation of the powered air intake apparatus and the powered attic exhaust assembly occurs at a neutral pressure differential between the living area and attic space. The integrated electronic controller is also configured, based on a second or constant and more extreme temperature threshold comparison, to coordinate the operation of a powered air intake apparatus and a powered attic exhaust assembly independently of the HVAC system such that actuation of the powered air intake apparatus and the powered attic exhaust assembly occurs regardless if the HVAC system is ON or OFF. A thermostat, which may include a thermometer in certain applications, and humidistat located in the attic space provide ambient condition readings. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a front elevation view of one embodiment of an integrated attic ventilation, air conditioning and heating system electronic controller according to the teachings presented herein installed in an attic space of a building structure;

FIGS. 2 through 5 are front elevation views of further embodiments of the integrated attic ventilation, air conditioning and heating system electronic controllers deployed in various attic space configurations;

FIG. 6 is a schematic block diagram depicting the integrated electronic controllers presented in FIGS. 1 through 5 in an attic ventilation, air conditioning and heating system environment;

DETAILED DESCRIPTION OF THE INVENTION

Figure 4:
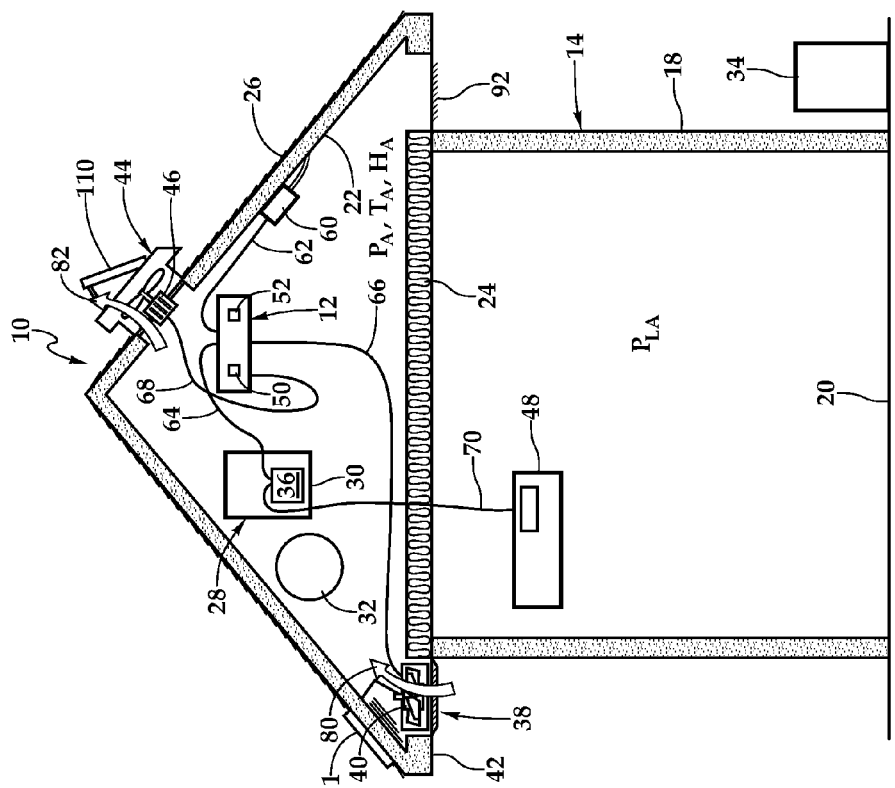

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a system for integrated attic ventilation, air conditioning and heating system deployment, which is schematically illustrated and designated 10. The system 10 includes one embodiment of an integrated electronic controller that provides efficient cooling and heating to a building structure 14 having an interior 16 and an exterior 18. The interior 16 includes a living area 20 and an attic space 22. Insulation 24 is located between the living area 20 and attic space 22. A roof 26 bounds the attic space 22. It should be understood that although the building structure 14 is depicted as a house, other building structures having a living space and an attic space are within the teachings presented herein.

A heating, ventilation and air conditioning (HVAC) system 28 is deployed through the building structure 14 to service the living area 20. The HVAC system 28 includes an attic mounted heat/furnace air handling unit 30 with insulated air ducts 32. Further, the HVAC system includes air conditioning operation, heating/furnace operation, and fan operation, for example. An air conditioner 34 is positioned at the exterior 18 of the building structure 14. A master electronic control board 36 is located within the attic space 22 in communication with HVAC system 28, including the individual components of the HVAC system 28.

A powered air intake apparatus 38, including a fan 40, is at least partially located in the attic space 22 and, as shown, is positioned at the interface of the exterior 18 and the attic space 22 at eave 42. The powered air intake apparatus 38 is configured to move air from the exterior 18 of the building area to the attic space 22. A powered attic exhaust assembly 44, which includes a fan 46, is at least partially located in the attic space 22, and, as shown, is positioned at the roof 26. The powered attic exhaust assembly 44 is configured to move air from the attic space 22 to the exterior 18 of the building structure 14. In one embodiment, a powered intake/exhaust pathway is defined by the powered air intake apparatus 38 and the powered attic exhaust assembly 44 and it should be appreciated that the powered intake/exhaust pathway or intake/exhaust pathway may include only one of the powered air intake apparatus 38 and the powered attic exhaust assembly 44. It should be appreciated, however, that in accordance with the teachings presented herein the powered intake/exhaust pathway may include only one of the powered air intake apparatus 38 and the powered attic exhaust assembly 44.

A thermostat 48 is located within the living area 20 to maintain the temperature in the living area 20 near a desired setpoint. The thermostat 48 accomplishes this by switching the HVAC system 28 ON and OFF, and/or regulating the flow of air as needed, to maintain the correct internal temperature in the living area 20. An intermittent set 50 of thermostats and humidistats is located in the attic space 22 to receive ambient temperature ($T_A$) readings and ambient humidity ($H_A$) in the attic space 22. Similarly, a corresponding constant set 52 of thermostats and humidistats is also located in the attic space 22. It should be understood that the intermittent and constant sets 50, 52 may include one or more sets of paired thermostats, such as a first thermostat configured for an intermittent mode of operation at intermittent set 50 and a second thermostat configured for a constant mode of operation at constant set 52.

The integrated electronic controller 12 located within the attic space 22 is disposed in control communication with the HVAC system 28, which includes an intermittent operational mode and a constant operational mode. It should be appreciated that although one placement of the thermostat, and humidistat is depicted and described, other placements, including attachment to other components of the HVAC system 28, including the air handling unit 30.

A power source 60, which may be electrical, solar, or battery, for example, supplies power via power cable 62 to integrated electronic controller 12 and other components within the system 10, as required. As shown, a cable 64 forms the connection between the integrated electronic controller 12 and the air handling unit 30. Similarly, cabling 66 makes the connection between the powered air intake apparatus 38 and the electronic controller 12, cabling 68 between the powered air exhaust assembly 44 and the electronic controller 12, and cabling 70 between the interior thermostat 48 and the master electronic control board 36 of the HVAC system 28. As will be discussed further hereinbelow, although one particular architecture of the system 10 is illustrated in FIG. 1, other architectures are within the teachings presented herein.

In operation, the integrated electronic controller 12 performs a temperature comparison by comparing the ambient temperature and ambient humidity to pre-determined threshold temperature and humidity conditions. The integrated electronic controller, based on the temperature comparison, coordinates the operation of the powered air intake apparatus and the powered attic exhaust assembly with the operational mode of the HVAC system to actuate the power. More particularly, the integrated electronic controller is configured to actuate powered attic ventilation equipment to operate intermittently and with the HVAC system at a lower temperature and/or humidity, and/or frost/freeze settings as well as configured for constant operation at higher temperature and/or humidity, and/or frost freeze settings. With respect to the lower or intermittent operational mode and thresholds, the air intake apparatus and the powered attic exhaust assembly may be configured to operate when a pressure differential between the living area and attic space is more neutral, therefore leading to energy efficiencies. This occurs when the HVAC system is ON and the intermittent operational mode may be configured to operate dependently on the HVAC system. On the other hand, if extreme conditions are present in the attic, then in the constant operational mode, the intake/exhaust pathway is actuated regardless of the state of the HVAC system. In the constant operational mode, in one embodiment, using both powered intake and powered exhaust mitigates non-neutral pressure and/or enables a more neutral pressure.

That is, as the HVAC system 28 is being turned ON and OFF or cycled therebetween, depending on the mode of operation, by the interior climate control demand from the interior thermostat 48, the master electronic control board 36 provides inputs to the integrated electronic controller 12 providing for intermittent controls, for example, to operate the powered air intake apparatus 38 and the powered air exhaust assembly 44, according to the lower or less extreme, i.e., intermittent pre-determined thresholds. Therefore, in the intermittent operational mode, the action of the powered air intake apparatus and the powered air exhaust assembly 44 simultaneously is powered ON and OFF with the operating cycles of the HVAC system 28. In this embodiment, these actions allow a stabilizing and more neutral pressure in the attic space (attic area pressure, $P_A$, is approximate to living area pressure, $P_{LA}$) and, therefore, the building structure 14 when using the powered ventilation equipment, which includes the powered air intake apparatus 38 and the powered air exhaust assembly 44. While allowing the powered attic ventilation equipment to work more intermittently, thus reducing operation time during heat, cold or humid environmental conditions. If extreme temperature or humidity conditions are present in the attic however, the constant operational mode causes the powered attic ventilation equipment to operate regardless of the HVAC operational state as these more extreme temperature or humidity conditions present a more extreme and immediate threat.

Upon the coordinated activation of the powered air intake apparatus and the powered attic exhaust assembly, as shown by airflow arrows 80 and 82, air circulates through the attic space 22. As a result, the air trapped within the attic air space and any heat corresponding thereto is relieved. Also, any high, inside relative humidity that may lead to condensation is relieved. That is, the embodiments presented herein provide several desirable and unique electronic control features. One of the control features provides the powered air intake apparatus and powered air exhaust assembly collaborative or dual operation during the ON and OFF operation of the HVAC system, that, in one embodiment may operate at temperatures as low as 32° F. (0° C.) and as high as 160° F. (71° C.).

Figure 3:
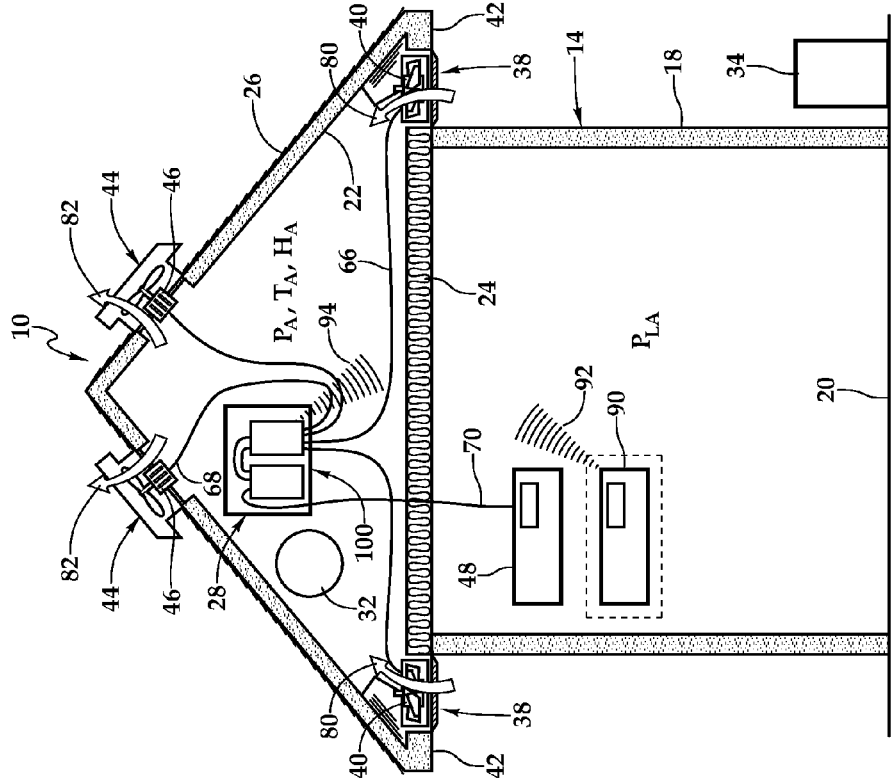

As previously mentioned, various other architectures of the system 10 are within the teachings presented herein. Referring to FIG. 2, the system 10 may include an alternate placement of a wireless thermostat 90 in the living area 22. In this embodiment, the wireless thermostat 90 is communicating wirelessly with the integrated electronic controller 12 as shown by wireless signals 92, 94. The dashed box around the wireless thermostat 90 indicating the wireless thermostat 90 is an alternative to the thermostat 48. Referring to FIG. 3, in another embodiment of the system 10, an integrated electronic controller 100 includes the capabilities of the controller 12 and the air handling unit 30 and/or the master electronic control board 36. This embodiment may be an OEM offering. Referring to FIG. 4, a solar powered air exhaust subassembly 110 and a solar powered air intake apparatus 111 form a portion of the powered air exhaust assembly 44 and it should be appreciated various components may include solar power. Referring to FIG. 5, an individual I is using an application on a mobile device 112 to wirelessly communicate with, operate, including program, command, and/or control, the integrated electronic controller 12 as shown by wireless communication signals 94 and 114. It should be appreciated that this communication may occur over a local network, use a short-range communication protocol, or the communication may occur via the Internet.

Referring now to FIG. 6, one embodiment of the integrated electronic controller 12 is depicted in additional detail. The controller 12 includes intermittent operation controls 120, constant operation controls 122, and communication controls 124. In one embodiment, the intermittent and constant operation modes are paired, such that an intermittent thermostat, for example, corresponds to a constant thermostat. The intermittent operation controls 120 include a thermostat sensor interface 126, a frost/freeze sensor interface 128 and a humidity sensor interface 130. Similarly, the constant operation controls include a thermostat sensor interface 132, a frost/freeze sensor interface 134, and a humidity sensor interface 136. The communication controls 124 include a wireless module interface 138 that is configured to send and receive communications, include command, control, and operational communications, wirelessly.

The intermittent operation controls 120 and constant operation controls 122 compare ambient conditions within the attic, ambient temperature ($T_A$) and ambient humidity ($H_A$), to the summer threshold temperature ($T_{TS}$), which is the summer intermittent temperature ($T_{IS}$) or the summer constant temperature ($T_{CS}$); the winter threshold temperature ($T_{TW}$), which is the winter intermittent temperature ($T_{IW}$) or the winter constant temperature ($T_{CW}$); and the threshold humidity ($H_T$), which is the intermittent humidity ($H_I$) or the constant humidity ($H_C$). The following table, Table I, shows exemplary ranges and settings of these various thresholds. It should be appreciated that these values may be adjusted depending on the exact application.

TABLE I

Exemplary Threshold Values

| Threshold | Exemplary Range | Exemplary Value |
|---|---|---|
| $T_{CS}$ | 60° F. (16° C.) to 160° F. (71° C.) | 140° F. (60° C.) |
| $T_{IS}$ | 60° F. (16° C.) to 120° F. (49° C.) | 110° F. (43° C.) |
| $T_{IW}$ | 32° F. (0° C.) to 50° F. (10° C.) | 45° F. (7° C.) |
| $T_{CW}$ | 32° F. (0° C.) to 50° F. (10° C.) | 32° F. (0° C.) |
| $H_C$ | 30% to 90% | 90% |
| $H_I$ | 30% to 90% | 65% |

As shown in Table I, the constant operational mode monitors for more extreme temperatures ($T_{CS}$, $T_{CW}$) and humidity conditions ($H_C$) and if one of these more extreme threshold conditions is exceeded, the intake/exhaust pathway is actuated to mitigate the extreme conditions. By way of comparison, the intermittent operational mode monitors for extreme temperatures ($T_{IS}$, $T_{IW}$) and humidity conditions ($H_I$) and if one of these extreme threshold conditions is exceeded, the intake/exhaust pathway is actuated. In particular, the constant operational mode threshold conditions are more extreme and threatening than the intermittent mode threshold conditions.

Continuing to refer to FIG. 6, the thermostat sensor interface 126 and thermostat sensor interface 132 are, in one implantation, paired. The frost/freeze sensor interface 128 and the frost/freeze sensor interface 134 are paired and the humidity sensor interface 130 and humidity sensor interface 136 are paired. An embodiment of the integrated electronic controller 12 may include one, two or three of these pairings. The integrated electronic controller 12 is configured to actuate the powered attic ventilation equipment and intake/exhaust pathway to operate intermittently and with the HVAC system at the lower temperature and/or humidity, and/or frost/freeze (i.e., intermittent) settings as well as configured for constant operation at higher temperature and/or humidity, and/or frost freeze (i.e., constant) settings. Moreover, the constant operational mode trumps the intermittent mode and if the constant operational mode actuates the intake/exhaust pathway, then the intermittent mode will not actuate the intake/exhaust pathway.

Figure 7:
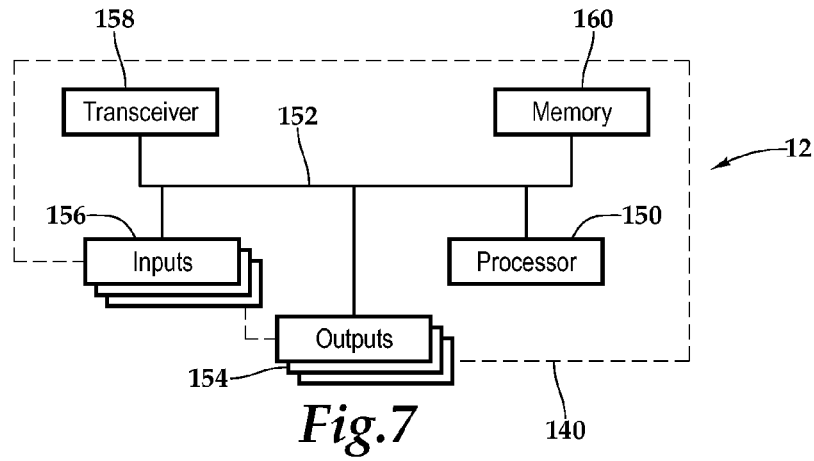
FIG. 7 is a schematic block diagram depicting one embodiment of the integrated electronic controller of FIG. 6 in further detail.

Referring now to FIG. 7, one embodiment of the integrated electronic controller 12 is depicted in further detail. A processor 150 is disposed in the housing 140. A bus 152 connects the processor to various outputs 154, inputs 156, a transceiver 158, and a memory 160, which may include various combinations of ROM, RAM, and firmware. The outputs 154 and inputs 156 along with the transceiver 158 provide the interfaces for communication with the temperature input at the thermostat sensor interface 126 and the thermostat sensor interface 132, the humidity input at the humidity sensor interface 130 and the humidity sensor interface 136, the first control output for signaling the powered air intake apparatus 38, the second control output for signaling the powered air exhaust assembly 44, and the HVAC communication connection via the master electronic control board 36, for example. As mentioned, the memory 160 is accessible to the processor 150, and the memory 160 includes processor-executable instructions that, when executed, cause the processor 150 to determine if the ambient temperature ($T_A$) exceeds a constant threshold temperature ($T_C$).

The processor 150, via the outputs 154 then sends, based on the constant temperature ($T_C$) threshold being exceeded, a control signal to the powered intake/exhaust pathway via the outputs 154. The processor then determines, if the ambient temperature ($T_A$) exceeds the intermittent threshold temperature ($T_I$), and sends, based on the constant temperature ($T_C$) threshold not being exceeded and the intermittent ($T_I$) threshold temperature being exceed, the control signal to the powered intake/exhaust pathway.

Figure 8:
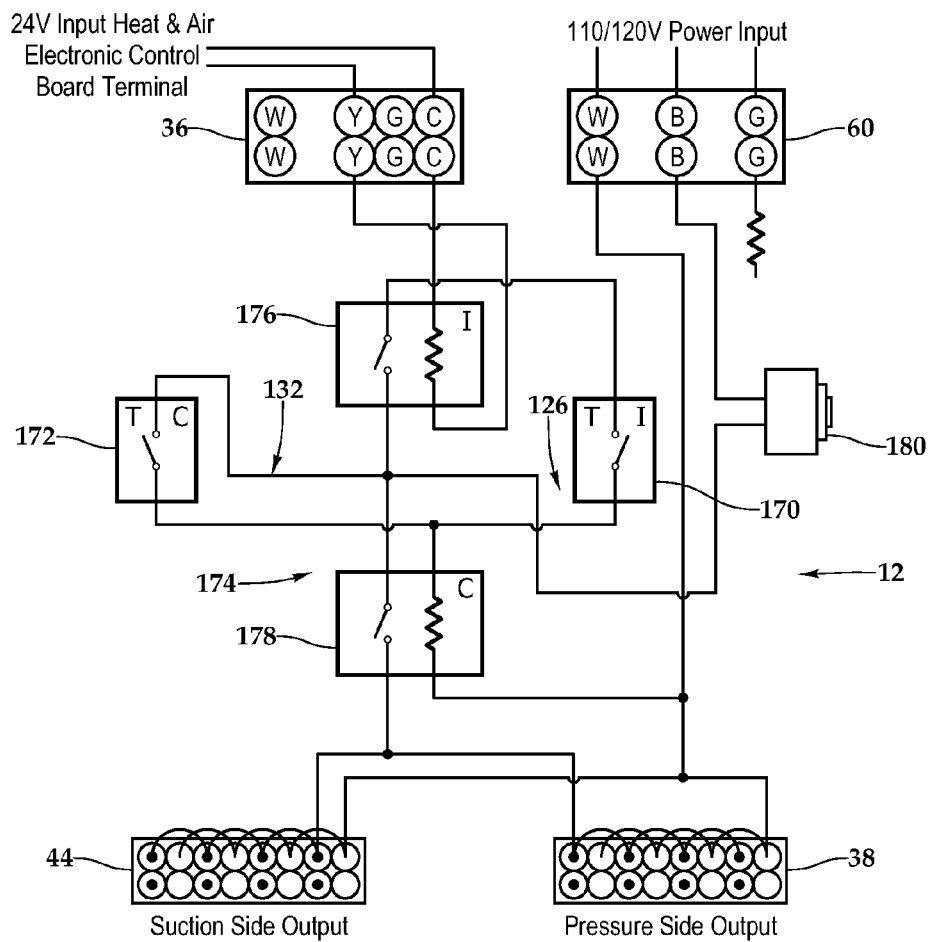
FIG. 8 is a schematic block diagram depicting a further embodiment of the integrated electronic controller of FIG. 6 in further detail.

Referring now to FIG. 8, a further embodiment of the integrated electronic controller 12 of FIG. 6 is depicted in additional detail. As shown, an intermittent temperature input 126 is configured to receive an ambient temperature ($T_A$) from an intermittent thermostat 170 reading the temperature in the attic space. Similarly, a constant temperature input 132 is configured to receive an ambient temperature ($T_A$) from a constant thermostat 172 reading the temperature in the attic space. As discussed, the intermittent operational mode of the intermittent thermostat operates dependently with the ON/OFF cycles of the air conditioning and heating system. On the other hand, the constant operational mode of the constant thermostat operates independently of the ON/OFF cycles of the air conditioning and heating system. Additionally, the constant operational mode overrides the intermittent operational mode. Therefore, the intermittent thermostat 170 only actuates the intake/exhaust airflow pathway if the HVAC system is ON and the constant operational mode is not active, e.g., the constant thermostat has not activated the intake/exhaust airflow pathway.

A control circuit 174, which may be a relay circuit or a thermostat relay, includes a thermostat relay 176 and a thermostat relay 178 coupled to the temperature inputs 126, 132. The control circuit 174 is configured to send, based on the ambient temperature ($T_A$) reading exceeding a constant threshold temperature ($T_C$), a control signal 182 to the powered intake/exhaust pathway, as represented by the powered air intake apparatus 38 and powered air exhaust assembly 44 connections. The control circuit 174 is also configured to send, based on the ambient temperature ($T_A$) not exceeding the constant threshold temperature ($T_C$) and the ambient temperature ($T_A$) exceeding intermittent threshold temperature ($T_I$), the control signal 182 to the powered intake/exhaust pathway, as represented by the powered air intake apparatus 38 and the powered air exhaust assembly 44 connections.

As shown, the master electronic control board 36 connector and the power source 60 connector are connected to the integrated electronic controller 12. Additionally, a circuit breaker 180 forms a portion of the integrated electronic controller 12. As illustrated, the integrated electronic controller 12 includes two paired thermostats, one constant and one intermittent. These paired thermostats may be set for hot, summer weather (e.g., using $T_{CS}$ and $T_{IS}$) or cold, winter weather (e.g., using $T_{IW}$ and $T_{CW}$). Further, it should be appreciated that a second set of paired thermostats may be added to the circuit such that the integrated electronic controller 12 may be set for hot, summer weather (e.g., using $T_{CS}$ and $T_{IS}$) and cold, winter weather (e.g., using $T_{IW}$ and $T_{CW}$). Further still, a set of paired humidistats may be added to monitor for the humidity exceeding the boundaries (e.g., $H_C$ and $H_I$).

Figure 9:
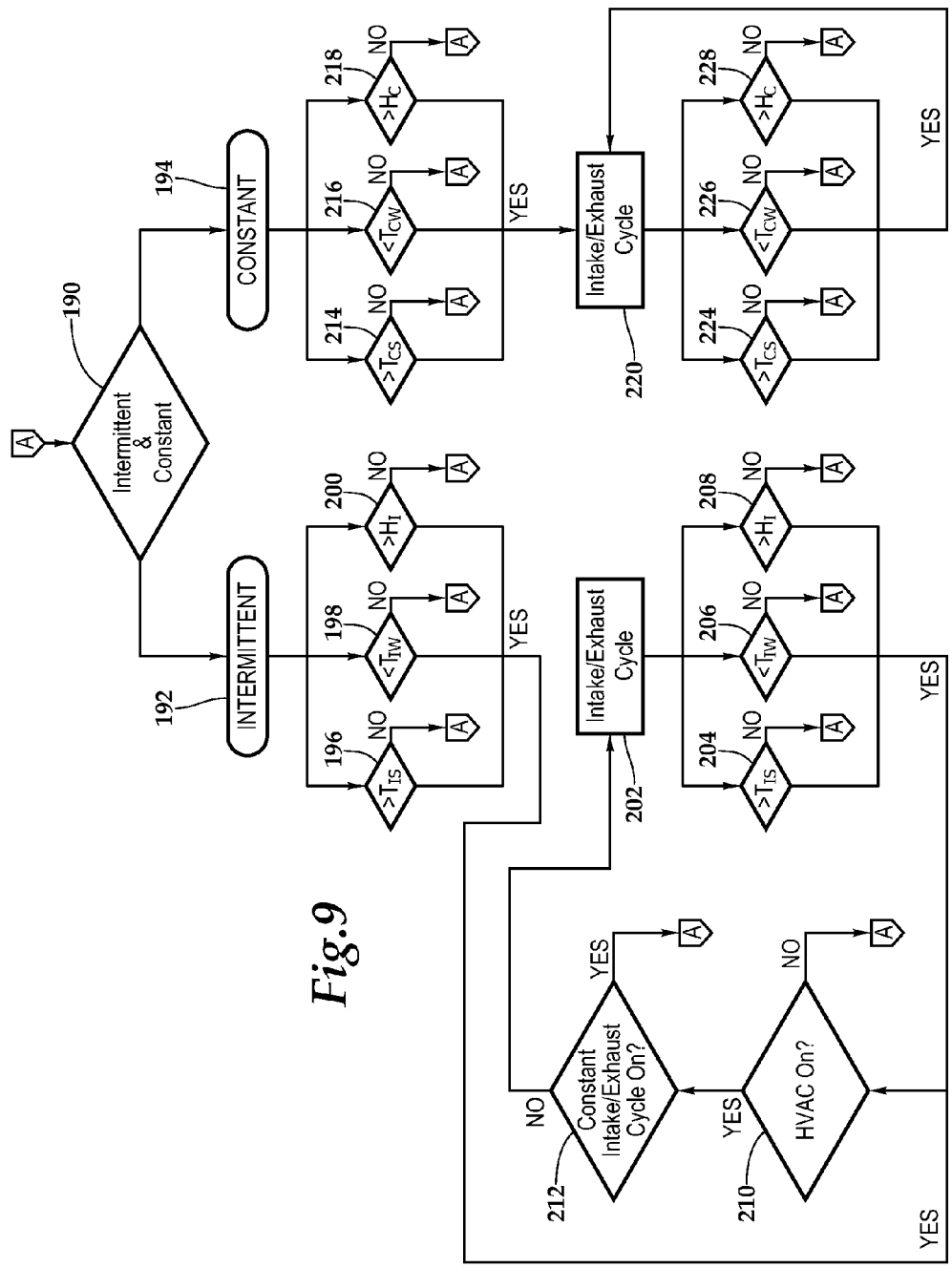
FIG. 9 is a flow chart depicting one embodiment of the internal logic of the integrated electronic controller of FIG. 6.

Referring now to FIG. 9, one embodiment of the internal logic of the integrated electronic controller 12 of FIG. 6 is shown. At pairing block 190, both modes of operation are selected and appropriately, the logic advances to the intermittent mode of operation at block 192 and the constant mode of operation at block 194. When the intermittent mode of operation is selected, ambient conditions within the attic, ambient temperature ($T_A$) and ambient humidity ($H_A$), are compared to the summer threshold temperature ($T_{TS}$), shown as summer intermittent temperature ($T_{IS}$) at block 196; the winter threshold temperature ($T_{TW}$), shown as winter intermittent temperature ($T_{IW}$) at block 198; and the threshold humidity shown as the intermittent humidity ($H_I$) at block 190.

If the ambient temperature is greater than the summer intermittent temperature ($T_{IS}$) or less than the winter intermittent temperature ($T_{IW}$), then the threshold conditions are exceeded and the logic advances to decision block 210. Similarly, if the threshold intermittent humidity ($H_I$) is exceeded, the logic advances to decision block 210. If the thresholds are not exceeded, then the logic returns to decision block 190. At decision block 210, if the HVAC system is ON, then the process continues to decision block 212, where if the constant intake/exhaust cycle is not ON, that is OFF, then the logic advances to block 202. Decision blocks 210 and 212 represent one embodiment of the properties of the intermittent mode of operation and relationship between the intermittent and constant modes of operation. In particular, as discussed, in one implementation, the intermittent mode only activates an intake/exhaust cycle if the HVAC system is ON. Additionally, the constant operational mode overrides the intermittent operational mode and, therefore, the intermittent operational mode only activates the intake/exhaust cycle if the constant operational mode has not already activated an intake/exhaust cycle.

At block 202, an intake/exhaust cycle is actuated and during the operation of the HVAC system, such that there is an approximate more neutral pressure between the living area and attic space. Following the operation of the intake/exhaust cycle, when air flow occurs through the attic space, at blocks 204, 206, and 208, ambient conditions within the attic, ambient temperature ($T_A$) and ambient humidity ($H_A$), are compared to the summer threshold temperature ($T_{TS}$), shown as summer intermittent temperature ($T_{IS}$) at block 204; the winter threshold temperature ($T_{TW}$), shown as winter intermittent temperature ($T_{IW}$) at block 206; and the threshold humidity shown as the intermittent humidity ($H_I$) at block 208. If the thresholds are still exceeded, then the logic returns to a further intake/exhaust cycle at block 202, via the decision blocks 210 and 212. On the other hand, if ambient conditions in the attic in terms of temperature and humidity are within operating parameters, then the methodology returns to decision block 190.

With reference, to decision blocks 214, 216, and 218, intake/exhaust cycle 220, and decision blocks 224, 226, and 228, under the constant operation mode as specified by block 194, ambient conditions within the attic, ambient temperature ($T_A$) and ambient humidity ($H_A$), are compared to the summer threshold temperature ($T_{TS}$), shown as summer constant temperature ($T_{CS}$) at blocks 214 and 224; the winter threshold temperature ($T_{TW}$), shown as winter constant temperature ($T_{CW}$) at blocks 216 and 226; and the threshold humidity ($H_T$) shown as the constant humidity ($H_C$) at blocks 218 and 218. Similar to the operation describe in blocks 196 through 200 and blocks 204 and 208, if the thresholds are exceeded, then the logic operates intake/exhaust cycles at block 220. The intake/exhaust cycles of the constant operational mode 194 at block 220 occur independently of the ON/OFF state of the HVAC system. On the other hand, if ambient conditions in the attic in terms of temperature and humidity are within operating parameters, then the methodology returns to decision block 190.

Further, in another embodiment, the integrated electronic control and HVAC system use only the intermittent mode of operation wherein the integrated electronic control is configured to send, based on the ambient temperature ($T_A$) exceeding intermittent threshold temperature ($T_I$) and the HVAC system being ON, the control signal to the powered intake/exhaust pathway, which, as mentioned, may include the powered air intake apparatus and/or the powered attic exhaust assembly. In this mode of operation, the intermittent operational mode may be operating dependently with the ON/OFF cycles of the HVAC system. More particularly, in one implementation, this operation includes selecting an operational dependency from the group consisting of operational dependence on the air conditioning operation, operational dependence on the heating/furnace operation, and operational dependence on the fan operation.

Accordingly, the teachings presented herein provide a process, method, and control with an integrated powered attic ventilation electronic control strategy and provides adaptive operations which may improve energy savings and energy costs while improving ventilation, cooling performance and frost/moisture reduction/elimination within the attic space and building structure. Additionally, the integrated electronic controller works with and manages the extended boundaries of the thermo-heat buildup or thermo loading found in the attic space more efficiently and effectively. The method for ventilation and cooling attic space presented herein for use in building structures may be employed with a collaborative influence of the air conditioning and heating systems operation.

In one embodiment presented herein, the operating temperature control ranges for the different types of powered attic ventilator equipment is extended. Moreover, the capabilities of operating and controlling of multiple and different types of powered attic ventilator equipment at one time in any configuration is provided, while eliminating the negative pressures or vacuum effects caused by other systems. In this manner, authentic integrated control operation of the powered attic ventilation equipment and the operation or non-operation of both the air conditioning and heating system may be achieved, including concurrent operation, whether wireless, cable or other means.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An integrated attic ventilation, air conditioning and heating system electronic controller comprising:
    a housing configured to be secured within an attic space in a building structure having a living area, the attic space including an intake vent and an exhaust vent, a powered intake and exhaust pathway overlaying the attic space from the intake vent to the exhaust vent, the building structure including an air conditioning and heating system;
    the powered intake pathway moves air from the exterior of the building structure to the attic space;
    the powered exterior pathway moves air from the attic space to the exterior of the building structure;
    a temperature input configured to receive an ambient temperature ($T_A$) from a thermostat reading the temperature in the attic space;
    a control output configured to send a control signal to the powered intake and exhaust pathway to effect operation thereof;
    an intermittent operational mode dependently operating with ON and OFF cycles of the air conditioning and heating system;
    a constant operational mode independently operating with ON and OFF cycles of the air conditioning and heating system, the constant operational mode overriding an intermittent operational mode, the constant operational mode being OFF unless the ambient temperature ($T_A$) exceeds a constant threshold temperature ($T_C$);
    an HVAC communication connection configured to facilitate data exchange with a master electronic control board of the air conditioning and heating system;
    a processor disposed in the housing and coupled to the temperature input, a humidity input, the first control output, a second control output, and the HVAC communication connection; and
    a memory accessible to the processor, the memory including processor-executable instructions that, when executed, cause the processor to:
        determine if the ambient temperature ($T_A$) exceeds the constant threshold temperature ($T_C$),
        send, based on the constant temperature ($T_C$) threshold being exceeded, a control signal to the powered intake pathway,
        send, based on the constant temperature ($T_C$) threshold being exceeded, a control signal to the powered exhaust pathway,
        determine, if the ambient temperature ($T_A$) exceeds an intermittent threshold temperature ($T_I$),
        send, based on the constant temperature ($T_C$) threshold not being exceeded and the intermittent temperature ($T_I$) threshold being exceed, the control signal to the powered intake pathway, and
        send, based on the constant temperature ($T_C$) threshold not being exceeded and the intermittent temperature ($T_I$) threshold being exceed, the control signal to the powered exhaust pathway.

2. The integrated attic ventilation, air conditioning and heating system electronic controller as recited in claim 1, further comprising a wireless transceiver located within the housing and coupled to the electronic controller, the wireless transceiver configured to communicate with a wireless thermostat.

3. The integrated attic ventilation, air conditioning and heating system electronic controller as recited in claim 2, further comprising establishing a pairing between a wireless-enabled interactive handheld device and the processor such that program, command, and control instructions are received at the processor from the wireless-enabled interactive handheld device.

4. The integrated attic ventilation, air conditioning and heating system electronic controller as recited in claim 1, wherein, in the intermittent operational mode, the intermittent temperature ($T_I$) threshold comprises a summer threshold temperature ($T_{TS}$) of 110° F. (43° C.).

5. The integrated attic ventilation, air conditioning and heating system electronic controller as recited in claim 1, wherein, in the intermittent operational mode, the intermittent temperature ($T_I$) threshold comprises a winter threshold temperature ($T_{TS}$) of 45° F. (7° C.).

6. The integrated attic ventilation, air conditioning and heating system electronic controller as recited in claim 1, further comprising, in the intermittent operational mode, a humidistat measuring an ambient attic humidity ($H_A$) against a humidity threshold ($H_T$) of 65%.

7. The integrated attic ventilation, air conditioning and heating system electronic controller as recited in claim 1, wherein, in the constant operational mode, the constant temperature ($T_C$) comprises a summer threshold temperature ($T_{TS}$) of 140° F. (60° C.).

8. The integrated attic ventilation, air conditioning and heating system electronic controller as recited in claim 1, wherein, in the constant operational mode, the constant temperature ($T_C$) comprises a winter threshold temperature ($T_{TS}$) comprises of 32° F. (0° C.).

9. The integrated attic ventilation, air conditioning and heating system electronic controller as recited in claim 1, further comprising, in the constant operational mode, a humidistat measuring an ambient attic humidity ($H_A$) against a humidity threshold ($H_T$) of 90%.

10. The integrated attic ventilation, air conditioning and heating system electronic controller as recited in claim 1, further comprising a power source coupled to the integrated attic ventilation, air conditioning system electronic controller, the power source selected from the group consisting of electrical, solar, and battery.

11. An integrated attic ventilation, air conditioning and heating system electronic controller comprising:
a housing configured to be secured within an attic space in a building structure having a living area, the attic space including an intake vent and an exhaust vent, a powered intake and exhaust pathway overlaying the attic space from the intake vent to the exhaust vent, the building structure including an air conditioning and heating system;
the powered intake pathway moves air from the exterior of the building structure to the attic space;
the powered exterior pathway moves air from the attic space to the exterior of the building structure;
a first temperature input configured to receive an ambient temperature ($T_A$) from a first thermostat reading the temperature in the attic space;
a second temperature input configured to receive an ambient temperature ($T_A$) from a second thermostat reading the temperature in the attic space;
a control output configured to send a control signal to the powered intake and exhaust pathway to effect operation thereof;
an intermittent operational mode operating dependently with ON and OFF cycles of the air conditioning and heating system;
a constant operational mode operating independently of ON and OFF cycles of the air conditioning and heating system, the constant operational mode overriding the intermittent operational mode, the constant operational mode being OFF unless the ambient temperature ($T_A$) exceeds a constant threshold temperature ($T_C$);
an HVAC communication connection configured to facilitate data exchange with a master electronic control board of the air conditioning and heating system;
a control circuit coupled to the first and second temperature inputs, the control circuit configured to send, based on the ambient temperature ($T_A$) reading exceeding the constant threshold temperature ($T_C$), a control signal to the powered intake pathway;
a control circuit coupled to the first and second temperature inputs, the control circuit configured to send, based on the ambient temperature ($T_A$) reading exceeding the constant threshold temperature ($T_C$), a control signal to the powered exhaust pathway;
the control circuit configured to send, based on the ambient temperature ($T_A$) not exceeding the constant threshold temperature (T) and the ambient temperature ($T_A$) exceeding an intermittent threshold temperature ($T_I$), the control signal to the powered intake pathway; and
the control circuit configured to send, based on the ambient temperature ($T_A$) not exceeding the constant threshold temperature (T) and the ambient temperature ($T_A$) exceeding an intermittent threshold temperature ($T_I$), the control signal to the powered exhaust pathway.

12. The integrated attic ventilation, air conditioning and heating system electronic controller as recited in claim 11, wherein, in the intermittent operational mode, the intermittent temperature ($T_I$) threshold comprises a summer threshold temperature ($T_{TS}$) of 110° F. (43° C.).

13. The integrated attic ventilation, air conditioning and heating system electronic controller as recited in claim 11, wherein, in the intermittent operational mode, the intermittent temperature ($T_I$) threshold comprises a winter threshold temperature ($T_{TS}$) of 45° F. (7° C.).

14. The integrated attic ventilation, air conditioning and heating system electronic controller as recited in claim 11, further comprising, in the intermittent operational mode, a humidistat measuring an ambient attic humidity ($H_A$) against a humidity threshold ($H_T$) of 65%.

15. The integrated attic ventilation, air conditioning and heating system electronic controller as recited in claim 11, wherein, in the constant operational mode, the constant temperature ($T_C$) comprises a summer threshold temperature ($T_{TS}$) of 140° F. (60° C.).

16. The integrated attic ventilation, air conditioning and heating system electronic controller as recited in claim 11, wherein, in the constant operational mode, the constant temperature ($T_C$) comprises a winter threshold temperature ($T_{TS}$) comprises of 32° F. (0° C.).

17. The integrated attic ventilation, air conditioning and heating system electronic controller as recited in claim 11, further comprising, in the constant operational mode, a humidistat measuring an ambient attic humidity ($H_A$) against a humidity threshold ($H_T$) of 90%.

18. The integrated attic ventilation, air conditioning and heating system electronic controller as recited in claim 11, further comprising a power source coupled to the integrated attic ventilation, air conditioning system electronic controller, the power source selected from the group consisting of electrical, solar and, battery.

19. A system for integrated attic ventilation, air conditioning and heating system deployment, the system comprising:
a powered air intake apparatus at least partially located in an attic space in a building structure having a living area serviced by a heating, ventilation and air conditioning system deployed through the building structure, the powered air intake apparatus configured to move air from an exterior of the building structure to the attic space;

a powered attic exhaust assembly at least partially located in the attic space, the powered attic exhaust assembly configured to move air from the attic space to the exterior of the building structure;

the powered intake pathway moves air from the exterior of the building structure to the attic space;

the powered exterior pathway moves air from the attic space to the exterior of the building structure;

a thermostat located in the attic space, the thermostat configured to receive an ambient temperature ($T_A$) reading in the attic space;

an integrated electronic controller located within the attic space, the integrated electronic controller disposed in control communication with the heating, ventilation and air conditioning system, the heating, ventilation and air conditioning system having an intermittent operational mode and a constant operational mode;

wherein the intermittent operational mode operates dependently with ON and OFF cycles of the air conditioning and heating system, the constant operational mode operates independently of ON and OFF cycles of the air conditioning and heating system, the constant operational mode overriding the intermittent operational mode;

the integrated electronic controller configured to perform a temperature comparison by comparing the ambient temperature and ambient humidity to pre-determined threshold temperature and humidity conditions;

the integrated electronic controller configured, based on the temperature comparison, to coordinate the operation of the powered air intake apparatus and the powered attic exhaust assembly with the operational mode of the heating, ventilation and air conditioning system such that actuation of the powered air intake apparatus and the powered attic exhaust assembly occurs when a first threshold temperature is exceeded; and the integrated electronic controller configured, based on the temperature comparison, to coordinate the operation of the powered air intake apparatus and the powered attic exhaust assembly independently of the operational mode of the heating, ventilation and air conditioning system such that actuation of the powered air intake apparatus and the powered attic exhaust assembly occurs when a second threshold temperature is exceeded, the second threshold temperature being more extreme than the first threshold temperature;

wherein the constant operational mode is OFF unless the ambient temperature exceeds the second threshold temperature.

* * * * *